United States Patent [19]
Johnston

[11] 3,763,417
[45] Oct. 2, 1973

[54] SHUT-OFF ARRANGEMENT FOR POWER CONTROLLED RECTIFIERS IN A DC TO AC INVERTER

[75] Inventor: Richard W. Johnston, Troy, Mich.

[73] Assignee: General Motors Corporation, Detroit, Mich.

[22] Filed: Aug. 26, 1971

[21] Appl. No.: 175,134

[52] U.S. Cl. .................. 321/5, 318/227, 321/45 C
[51] Int. Cl. ............................................ H02m 7/52
[58] Field of Search .................. 321/5, 4 SR, 45 C; 318/227

[56] References Cited
UNITED STATES PATENTS
3,681,675  8/1972   Preiser ............................ 321/45 C
3,414,800  12/1968  Sheldrake et al. ...................... 321/5
3,388,310  6/1968   Etter ...................................... 321/5

FOREIGN PATENTS OR APPLICATIONS
1,373,115  8/1964   France .................................. 321/5
1,055,855  1/1967   Great Britain ........................ 321/5

Primary Examiner—William M. Shoop, Jr.
Attorney—E. W. Christen et al.

[57] ABSTRACT

An AC induction motor is supplied excitation current from a source of direct voltage through a three-phase inverter. Each of the power controlled rectifiers of the inverter is shut off by applying the voltage of a shut-off capacitor through a respective shut-off controlled rectifier to the series combination of the source of direct voltage and the power controlled rectifier selected to be shut off. Accordingly, at the time of commutation, the voltage of the shut-off capacitor opposes the source voltage and provides reverse bias for the selected power controlled rectifier terminating conduction therethrough. Current continuity is maintained for the induction motor during shut-off intervals since the shut-off capacitor and the shut-off controlled rectifier provide a current path for the motor windings. In addition to providing current continuity during commutation, the shut-off circuit provides a path through which magnetic field energy stored in the motor windings is extracted and transferred to the shut-off capacitor.

3 Claims, 4 Drawing Figures

INVENTOR.
Richard W. Johnston
BY
C. L. McLeod
ATTORNEY

SHUT-OFF ARRANGEMENT FOR POWER CONTROLLED RECTIFIERS IN A DC TO AC INVERTER

This invention relates to an inverter power supply for supplying an AC induction motor from a source of direct voltage wherein commutation is effected by a shut-off capacitor connected in a series shut-off circuit with a selected power controlled rectifier and the source of direct voltage to terminate current flow through the selected power controlled rectifier by reverse biasing that power controlled rectifier.

Inverter power supply systems are generally known for supplying induction motors from direct current voltage sources. These known arrangements develop alternating voltage at the inverter output for supplying Y-connected, Delta-connected, or separately connected motor windings by periodically and sequentially switching power controlled rectifiers included in the inverter. Generally, Y-connected and Delta-connected windings are used in low horsepower motors, whereas separately connected windings are advantageously used for high horsepower motors in view of the increased number of power controlled rectifiers and the concomitant reduction in the voltage requirements of individual power controlled rectifiers.

Auxiliary commutation is necessary for inverter motor feed arrangements inasmuch as the power controlled rectifiers are supplied from a source of direct voltage. Many variations of basic shut-off arrangements are known in the art. Basically, most auxiliary shut-off arrangements effect shut off with the aid of shut-off reactors or shut-off capacitors providing stored energy for reverse biasing selected power controlled rectifiers at predetermined times. Typical prior art shut-off arrangements using capacitors as energy storage devices are shown in circuits in the U.S. Pat. Nos. Corry et al, 3,354,370, Salihi 3,384,804, and Koppelmann 3,399,336. The capacitors of these known shut-off circuits apply reverse bias potential directly across a selected power controlled rectifier at predetermined times to terminate current flow through the selected power controlled rectifier. During commutation, a motor current supply path is completed through the source of direct voltage which normally supplies the motor and the capacitor used for reverse bias. Accordingly, the motor load is subjected to a voltage level at commutation equal to the sum of both the source voltage and the shut-off voltage. Several adverse operating conditions may result from this composite voltage level and its application to the motor load: namely, 1. the blocking voltage requirements for shut-off controlled rectifiers are greater than the blocking voltage requirements of power controlled rectifiers; 2. free wheeling diodes are necessary to clip voltage spikes occurring at switching for shut off in view of the voltage level applied the motor load; and 3. the free wheeling diodes included to clip voltage spikes load the shut-off circuit in view of the placement of the diodes and the forward biased orientation of the diodes relative to shut-off voltage at commutation.

In contrast with known capacitor shut-off circuit arrangements, the present invention provides a simplified shut-off connection wherein shut-off voltage is applied to reverse bias a selected power controlled rectifier by connecting the voltage accumulated on a shut-off capacitor in opposition to the series combination of the source of direct voltage and the selected power controlled rectifier. Accordingly, with the arrangement of the present invention, the voltage applied the motor load never exceeds the level of the shut-off voltage accumulated on the shut-off capacitor and the adverse operating conditions set forth above are avoided.

The simplified commutation circuit of the present invention is applicable to Y-connected, Delta-connected, and separately connected motor winding arrangements. For each configuration, current continuity for the motor is maintained during commutation through a current path including the shut-off capacitor and the shut-off controlled rectifier used for the commutation. In this manner, energy stored in the magnetic field of the motor winding is extracted and transferred to the shut-off capacitor.

Accordingly, it is an object of the present invention to provide an inverter for supplying AC voltage excitation to an induction motor from a source of direct voltage wherein auxiliary commutation of respective power controlled rectifiers included in the inverter is effected by connecting a charged shut-off capacitor through a shut-off controlled rectifier across the series combination of a selected power controlled rectifier and the source of direct voltage.

Another object of the present invention is to provide a controlled rectifier inverter to convert DC power from a source of direct voltage to AC excitation for an induction motor wherein auxiliary commutation is effected by a shut-off capacitor and wherein current continuity through the induction motor is maintained during commutation in a path including the shut-off capacitor to thereby extract energy stored in the motor winding and transfer it to the shut-off capacitor.

Another object of the present invention is to provide an inverter to supply an AC induction motor from a source of direct voltage wherein the voltage applied to the induction motor during commutation does not exceed the shut-off voltage.

These and additional objects and advantages of the present invention will be apparent from the following description wherein the figures listed below are incorporated as illustrative of preferred embodiments.

Figure 1:
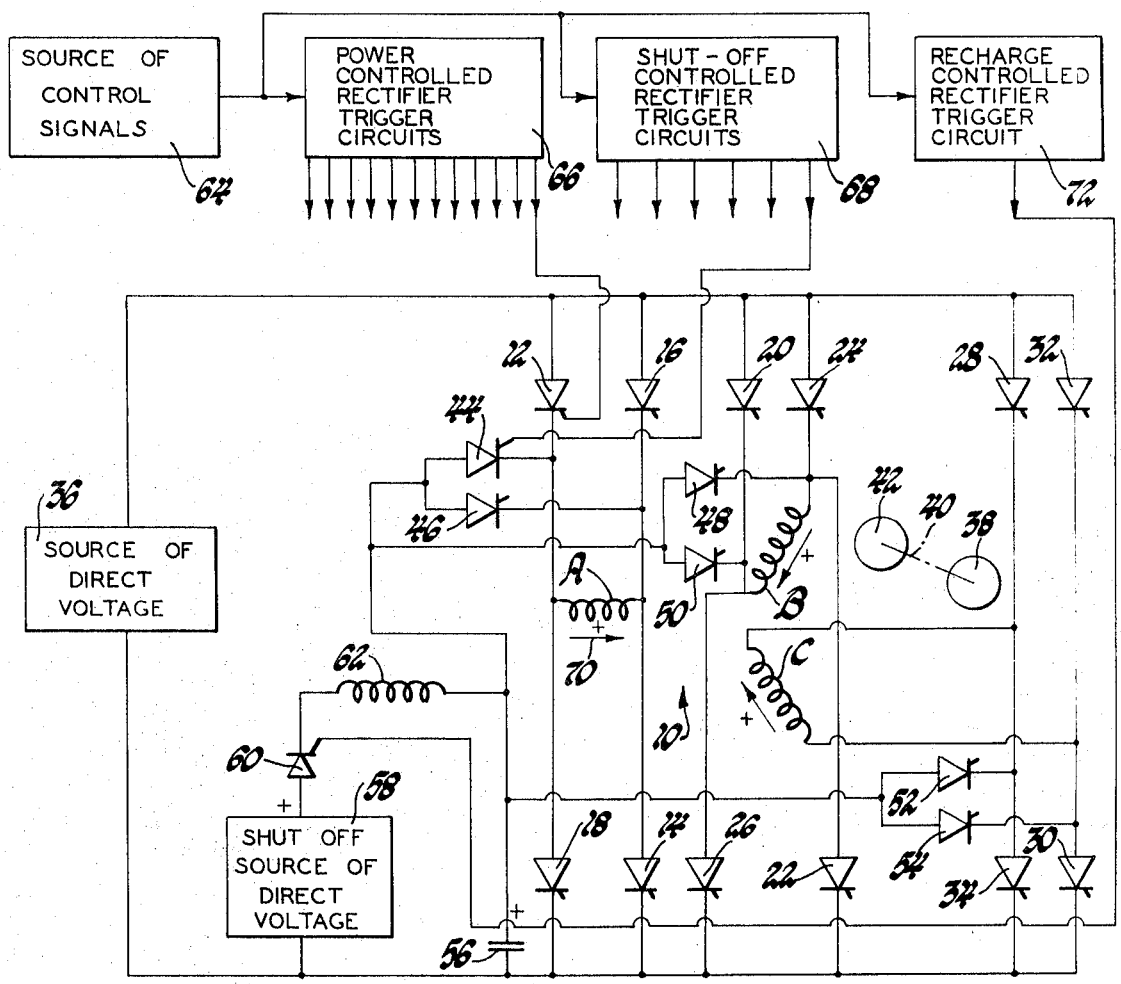
FIG. 1 is a circuit schematic of an inverter for supplying a separately connected AC induction motor winding including shut-off control according to the present invention.

Reference should now be made to the drawings and more particularly to FIG. 1 wherein an inverter motor supply system is shown for energizing an AC induction motor having its motor windings connected with a controlled rectifier inverter for independent excitation. The three separately connected motor phase windings A, B, and C of the induction motor 10 are supplied alternating voltage by the twelve power controlled rectifiers 12, 14, 16, 18, 20, 22, 24, 26, 28, 30, 32, and 34 connected with the source of direct voltage 36. The induction motor 10 drives a load 38 through an output connection 40 with the squirrel-cage rotor 42. The source of direct voltage 36 can take a variety of forms generally known in the art, and in particular, it is noted that this direct voltage source can take the form of a variable voltage source, if desired for a particular application. An example of the circuit required for the direct voltage source 36 is a full wave bridge rectifier converting an AC input to the required DC output; in this arrangement, a variable voltage is obtained if controlled rectifiers are included in the bridge to regulate the amplitude of the direct voltage output.

Inasmuch as the power controlled rectifiers 12 to 34 are connected with a direct voltage source, it is necessary to provide auxiliary commutation to terminate each conduction interval of each power controlled rectifier. This auxiliary commutation is performed by the six shut-off or commuting controlled rectifiers 44, 46, 48, 50, 52, and 54, a shut-off or commuting capacitor 56, and a shut-off source of direct voltage 58 connected through a recharge controlled rectifier 60 and a recharge circuit inductor 62 with the shut-off capacitor 56.

A source of control signals 64 effects primary control of the inverter operation according to a preselected sequence of control. For example, slip speed control of the induction motor 10 is obtained if the source of control signals 64 includes a signal correlated with the sum of a tachometer signal measurement of the operating speed of the induction motor and an auxiliary slip frequency control signal. Such a slip speed control motor supply system is more completely described in U.S. Pat. No. 3,323,032 Agarwal.

12 trigger control signals are provided from a first gating or gate control means shown in the drawing as power controlled rectifier trigger circuits 66 to control the initiation of conduction for the power controlled rectifiers 12 to 34. Each conductive interval by each of the 12 power controlled rectifiers is initiated on the occurrence of a respective trigger control signal. Trigger circuits 66 include, in a practical circuit, a gate and cathode connection with each of the 12 power controlled rectifiers; in the drawing, the trigger circuit outputs are represented by arrows which should be appreciated as being symbolic of the gate and cathode connections required between the power controlled rectifiers and the trigger circuits 66. The trigger circuits 66 are connected with the source of control signals 64 and all gate signals applied to the power controlled rectifiers 12 to 34 are initiated in response to signals from the source of control signals 64.

A second gating or gate control means represented in the drawing as shut-off controlled rectifier trigger circuits 68 provides six output trigger signals to control the initiation of conduction by the shut-off controlled rectifiers 44 to 54. The source of control signals 64 is connected with the shut-off controlled rectifier trigger circuits 68 to control the occurrence of gating signals to the shut-off controlled rectifiers. As noted above with respect to the power controlled rectifier trigger circuits 66, the shut-off controlled rectifier trigger circuits 68 require a gate and cathode connection between each shut-off controlled rectifier and the trigger circuits 68. A synchronized signal is provided by the trigger circuits 68 for each gate signal provided by trigger circuits 66 to develop the requisite sequential and periodic switching of the power controlled rectifiers to supply AC power to the motor winding 10 in accordance with controlled rectifier inverter action.

Trigger circuitry of the type required for the power controlled rectifier trigger circuits 66 and the shut-off controlled rectifier trigger circuits 68 is generally known in the art of motor control. One arrangement suitable for inclusion in the system of the drawing is fully disclosed and described in copending application Ser. No. 60,398, now U.S. Pat. No. 3,611,090 Richard W. Johnston et al, entitled "Shutter Wheel Tachometer." In that system, a logic array is used to generate the requisite synchronized and controlled trigger signals. It is noted that the present separately connected winding inverter supply system has twelve power controlled rectifiers whereas the system disclosed in Ser. No. 60,398 includes only six power controlled rectifiers; however, the six trigger signals provided by the trigger logic in Ser. No. 60,398 are readily adapted for control of the 12 power controlled rectifiers shown in the drawing since the 12 power controlled rectifiers are gated conductive in pairs in a manner more fully discussed below.

In operation, the three-phase windings A, B, and C of induction motor 10 are separately energized and each is alternately provided oppositely sensed excitation currents. The power controlled rectifiers 12 to 34 are connected to provide two circuit paths for each winding and are poled such that oppositely sensed currents can be controllably supplied each of the windings. For example, when controlled rectifiers 12 and 14 included in one current path for winding A are conductive, phase winding A is provided current having the sense indicated by the arrow 70. On the other hand, when controlled rectifiers 16 and 18 included in the other current path for winding A are conductive, phase winding A is provided current having a sense the opposite of that indicated by the arrow 70. Each of the windings in the drawing is shown with a reference arrow indicating the direction of current when positive voltage is applied to the winding. Current excitation similar to that noted for winding A obtains for the remaining phase windings B and C when the controlled rectifiers defining their respective current paths are gated conductive in pairs. Thus, it should be appreciated that sequential and periodic gating of the power controlled rectifiers 12 to 34 results in the appliction of AC voltage to the induction motor 10 driving the rotor 42 and the load 40.

The single shut-off capacitor 56 is used in the commutation of all twelve power controlled rectifiers at their appointed times. When the capacitor is charged with the polarity indicated in the drawing, it is set for commutation; after each commutation, the capacitor is charged by the motor 10 with a polarity the opposite of that indicated. The shut-off source of direct voltage 58, the recharge controlled rectifier 60, and the recharge circuit inductor 62 cooperate as a charging means to restore the indicated polarity for the subsequent commutation. A recharge controlled rectifier trigger circuit 72 supplies gating signals to the recharge controlled rectifier 60 at appropriate times with reference to the shut-off times to initiate conduction by the controlled rectifier 60 to restore th proper polarity and voltage level across the shut-off capacitor 56. A connection is made between the source of control signals 64 and the recharge controlled rectifier trigger circuit 72 the synchronize the conduction times of recharge controlled rectifier 60 with the gate signals from the trigger circuits 66 and 68. When the recharge controlled rectifier 60 is conductive, the shut-off source of direct voltage 58 is connected across the capacitor 56 to restore the indicated polarity and the recharge circuit inductor 62 augments the accumulated voltage by ringing the capacitor to a higher voltage level. The recharge controlled rectifier trigger circuit 72 can take a form similar to the trigger circuitry shown in Ser. No. 60,398; of course, other known trigger circuit arrangements could also be adapted to generate the required trigger signals. The output signals from this trigger circuit 72 are delayed with respect to the output signals from the shut-off controlled rectifier trigger circuits 68. Thus, by way of comparison with the trigger signals in application Ser. No. 60,398, the recharge controlled rectifier trigger circuit 72 is provided a delay similar to the delay of the power controlled rectifier trigger circuits. The delay time for the trigger circuit 72 is generally greater than the delay for the power controlled rectifier trigger circuits 66. In Ser. No. 60,398, a shift register is used to regulate trigger output pulse signals and the requisite trigger pulses for the trigger circuit 72 are readily developed in an analogous manner by one skilled in the art.

During motor operation, each of the three electrically isolated phase windings is alternately supplied oppositely sensed excitation currents through the two current paths interconnecting that phase winding with the source of direct voltage 36. Each current path includes a first power controlled rectifier connecting one end of its respective phase winding with the positive terminal of the source of direct voltage 36 and a second power controlled rectifier connecting the other end of the phase winding with the negative terminal of the source of direct voltage 36. Commutation of current through a current path is effected by applying shut-off voltage accumulated on the shut-off capacitor 56 to the series combination of the source of direct voltage 36 and the power controlled rectifier connected to the positive terminal of the source of direct voltage 36 and included in the current path to be shut off.

Figure 2:
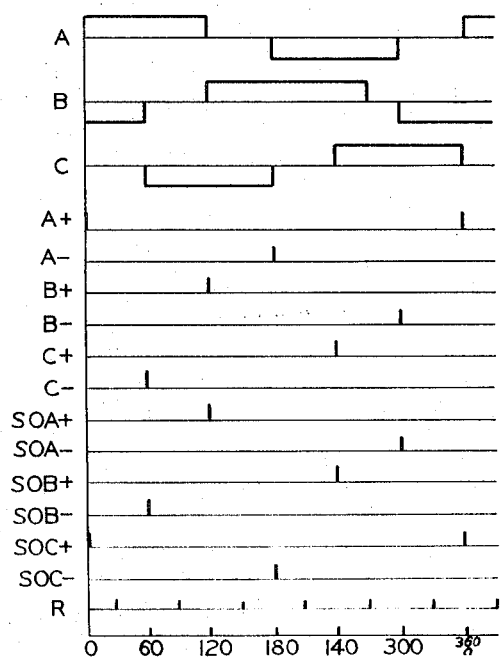
FIG. 2 is a timing diagram summarizing the operation of the inverters of FIG. 1 and FIG. 3.

An understanding of the operation of the motor supply of FIG. 1 is facilitated by considering its operation in conjunction with the timing diagram of FIG. 2. In the timing diagrams of FIG. 2, the voltages supplied phase windings A, B, and C are represented and labeled A, B, and C, respectively. In this graphical summary, alternate positive and negative 120° energization intervals are shown for each of the windings with 60° deenergized separations. Naturally, the actual voltage across a particular phase winding during operation deviates from the theoretically ideal rectangular waveforms shown in the diagrams.

Pulse trains A+, A−, B+, B−, C+, and C−, depicted in the diagrams of FIG. 2, represent the gating pulses initiating respective positive and negative voltage intervals for the similarly identified phase windings of the motor 10. Pulse trains SOA+, SOA−, SOB+, SOB−, SOC+, and SOC−, depicted in the diagrams of FIG. 2, represent the gating pulses necessary to gate the shut-off controlled rectifiers 44 to 54 to terminate respective excitation voltage pulses to the motor 10 by the commutation of the power controlled rectifiers supplying the phase windings. For example, SOA+ terminates the A+ voltage pulse by gating controlled rectifier 44 conductive applying the voltage of capacitor 56 to reverse bias controlled rectifier 12 to terminate the A+ voltage pulse, etc. Pulse train R, depicted in FIG. 2, represents the timing of gating pulses to the recharge controlled rectifier 60 necessary to restore the capacitor 56 to the polarity indicated subsequent to each commutation. The timing of these recharge controlled rectifier gating pulses is shown delayed 30° after the occurrence of each shut-off pulse; this timing delay is illustrative of the placement of recharge gate pulses intermediate each pair of commutations.

Considering the drawing of FIG. 1 in conjunction with the timing diagram of FIG. 2, tirgger circuits 66 provide the A+, A−, B+, B−, C+, and C− trigger signals; trigger circuits 68 provide the SOA+, SOA−, SOB+, SOB−, SOC+, and SOC− trigger signals; and trigger circuit 72 provides the R trigger signals. Thus, the A+ trigger signal from trigger circuits 66 gates controlled rectifiers 12 and 14 conductive at 0° to initiate a positive voltage pulse passing current in the direction of the arrow 70 through the phase winding A. For purposes of this analysis, prior operation is assumed and accordingly, phase B has continuity for its negative voltage pulse which was commenced 60° before the 0° reference. At 0°, the positive voltage which had been applied to phase winding C is terminated when the trigger circuits 68 supply a trigger signal SOC+ to gate controlled rectifier 54 conductive to reverse bias power controlled rectifier 32 terminating conduction therethrough. As discussed above, all trigger signals to power controlled rectifiers are delayed from the shut-off trigger signals which occur nominally at the 60° points. It should be borne in mind that a predetermined delay is used such as that in the trigger arrangement of Ser. No. 60,398.

Controlled rectifiers 32 and 34 were conductive up to 0° to provide positive voltage to phase winding C; at 0° shut-off controlled rectifier 54 is supplied the SOC+ trigger signal and commuting capacitor 56 charged with the polarity indicated applies a voltage to reverse bias power controlled rectifier 32. Capacitor 56 applies a reverse bias voltage across the series combination of power controlled rectifier 32 and the source of direct voltage 36. Since the voltage of capacitor 56 opposes and exceeds the voltage of the source 36, the power controlled rectifier 32 is reverse biased to its nonconductive state.

After power controlled rectifier 32 ceases conduction as a consequence of the reverse bias voltage applied by shut-off capacitor 56, current is sustained in phase winding C by the energy stored in the motor winding and on the capacitor 56. The requisite current path is provided by the shut-off circuit and is traced from the positive plate of capacitor 56, through shut-off controlled rectifier 54, through phase winding C, and through power cntrolled rectifier 34 to the negative plate of shut-off capacitor 56. Both the phase winding C and the shut-off capacitor 56 have energy stored in their respective magnetic and electric fields which must be dissipated prior to termination of conduction by power controlled rectifier 34 and commuting controlled rectifier 54. During the time energy is being transferred from the motor winding magnetic field to the capacitor 56, the capacitor is being charged with a polarity, the opposite of that indicated. Subsequently, when recharge controlled rectifier 60 is gated conductive, the capacitor 56 is recharged with the indicated polarity for the next commutation.

The commutation scheme of the present invention effects commutation of power controlled rectifiers by an auxiliary shut-off circuit including a capacitor energy storage device by reverse biasing a selected power controlled rectifier. The circuit arrangement ensures against application to the motor load of the combined voltage of the shut-off circuit and the voltage of the source of direct voltage supplying power to the inverter. Thus, the voltage supplied the motor never exceeds the voltage of the shut-off capacitor.

In certain modes of operation, substantial power demands are made on the shut-off source of direct voltage 58 in view of its function in recharging the capacitor 56 and the subsequent connection of the capacitor 56 with the motor load. This source of direct voltage 58 can take a variety of forms similar to those suggested above for the source of direct voltage 36; the rating of the source 58 is determined by the demands on this source during operation.

The entire operation of the inverter system of FIG. 1 follows from the foregoing examples. The timing diagrams define the switching times of the various controlled rectifiers necessary to develop the AC excitation required to operate the motor 10. Concurrent consideration of the inverter system and the timing diagrams provides a complete understanding of the system.

Figure 3:
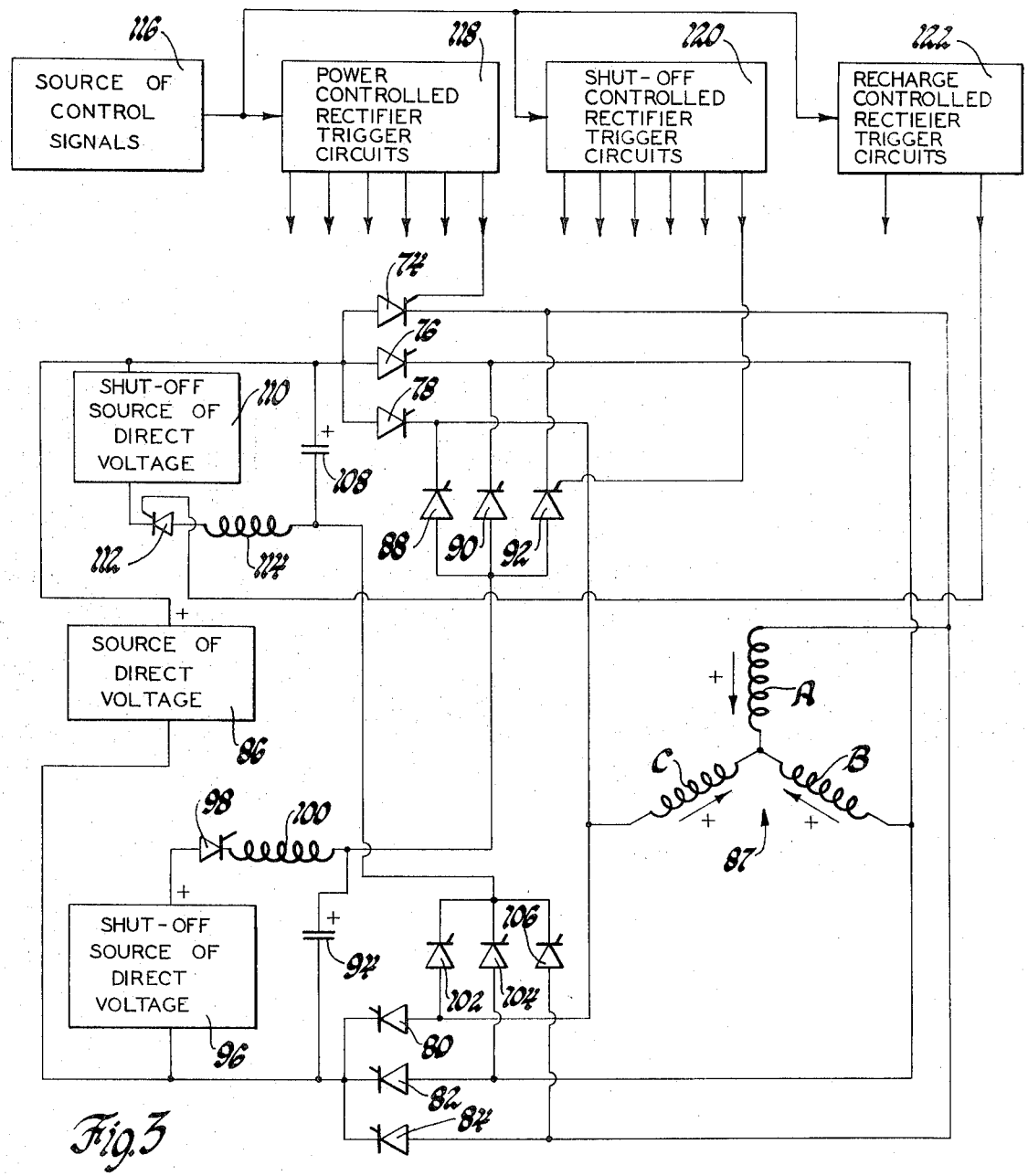
FIG. 3 is a circuit schematic of an inverter motor supply system interconnecting a source of direct voltage and a Y-connected induction motor winding including shut-off circuits according to the present invention.

Reference should now be made to FIG. 3 wherein a Y-connected AC induction motor is supplied from a source of direct voltage through a controlled rectifier inverter. Six power controlled rectifiers 74, 76, 78, 80, 82, and 84 interconnect the source of direct voltage 86 with the induction motor 87. The induction motor 87 has a three-phase Y-connected winding including phases A, B, and C, each providing one input terminal. The six power controlled rectifiers are divided into two groups: a positive group of power controlled rectifiers including controlled rectifiers 74, 76, and 78 have their anodes commonly connected with the positive terminal of the source of direct voltage 86 and their cathodes respectively connected with the three terminals of the phase windings A, B, and C; and a negative group of power controlled rectifiers including controlled rectifiers 80, 82, and 84 have their cathodes commonly connected with the negative terminal of the source of direct voltage 86 and their anodes respectively connected with the three input terminals to the phase windings A, B, and C.

A separate shut-off circuit is included for each of the two groups of power controlled rectifiers. Three positive shut-off controlled rectifiers 88, 90, and 92 have their cathodes respectively connected with the cathodes of the positive group of power controlled rectifiers 74, 76, and 78. A shut-off capacitor 94 is connected between the common anode connections of shut-off controlled rectifiers 88, 90, and 92 and the negative terminal connection of the source of direct voltage 86. A shut-off source of direct voltage 96, a recharge controlled rectifier 98, and a recharge circuit inductor 100 are connected across the shut-off capacitor 94 to restore the indicated polarity to the capacitor subsequent to each commutation. On the occasion of each commutation, the capacitor is charged to a polarity the opposite of that indicated according to the operation set forth more completely hereinafter.

Three nagative shut-off controlled rectifiers 102, 104, and 106 have their anodes respectively connected with the anodes of the negative group of power controlled rectifiers 80, 82, and 84 and their cathodes connected to a common terminal. A shut-off capacitor 108 is connected between the common cathode connection of shut-off controlled rectifiers 102, 104, and 106 and the positive terminal of the source of direct voltage 86. A shut-off source of direct voltage 110, a recharge controlled rectifier 112, and a recharge circuit inductor 114 restore the capacitor 108 to the indicated polarity subsequent to each commutation.

Gating control of the controlled rectifiers of this motor feed inverter is accomplished according to known principles in a manner similar to that set out above with reference to FIG. 1. Basically, a source of control signals 116 provides timing sequence inputs to three gating means to control the times of gating the controlled rectifiers. Power controlled rectifier trigger circuits 118, shut-off controlled rectifier trigger circuits 120, and recharge controlled rectifier trigger circuits 122 develop the necessary gating signals for their respective controlled rectifiers. The output gate connections are represented in the drawing by arrows; however, it should be understood that a gate and cathode connection between each of the controlled rectifiers and its respective trigger control is required for operation.

The motor windings of induction motor 87 are provided AC excitation by the six powered controlled rectifiers 74 to 84. These controlled rectifiers are conductive in pairs to develop the requisite excitation. One controlled rectifier from the positive group and one controlled rectifier from the nagative group is maintained conductive to supply the motor. At the close of each 60° of operation, one controlled rectifier is shut off and one controlled rectifier is gated conductive. By way of example, if controlled rectifiers 74 and 82 are conductive from 0° to 60°, phase winding A is supplied positive voltage and phase winding B is supplied negative voltage. At the 60° point, one of the controlled rectifiers will be shut off and one controlled rectifier connected with phase winding C will be gated conductive.

The timing diagrams of FIG. 2 depict the sequence of gate signals for the power controlled rectifiers and the shut-off controlled rectifiers of FIG. 3. Accordingly, from 0° to 60°, phase winding A is supplied a positive voltage pulse and phase winding B is supplied a negative voltage pulse through controlled rectifiers 74 and 82. Arrows representing current flow resulting from positive voltage are shown in the drawing to provide a reference for motor operation. At 60°, shut-off controlled rectifier 104 is gated conductive connecting the voltage of capacitor 108 across a series combination of the source of direct voltage 86 and the power controlled rectifier 82. Since the voltage of capacitor 108 opposes and esceeds the voltage of the source 86, power controlled rectifier 82 is reverse biased and current conduction therethrough is terminated. Capacitor 108 supplies the motor during the commutation period through a circuit traced from the positive plate of capactior 108 through power controlled rectifier 74, through phase windings A and B, and through shut-off controlled rectifier 104 to the negative plate of capacitor 108. Energy stored in the electric and magnetic fields of the capacitor and the motor windings is effective to reverse the polarity of the capacitor 108. After the capacitor 108 is fully charged with the reverse polarity of that indicated, the shut-off controlled rectifier 104 ceases conduction. Prior to the time controlled rectifier 104 ceases conduction, power controlled rectifier 80 is gated conductive such that phase windings A and C are energized from 60° to 120°. Subsequently, the capacitor 108 is restored to the indicated polarity at a voltage level adequate for the next commutation when recharge controlled rectifier 112 is gated conductive to connect the shut-off source of direct voltage 110 with the capacitor. The recharge circuit inductor 114 rings the capacitor to a voltage sufficient for the next commutation.

The R pulse train of FIG. 2 indicates the times for gating both recharge controlled rectifiers 90 and 112 of FIG. 3. It should be understood that the two recharge controlled rectifiers are alternately gated by successive pulses in the operation of the inverter motor feed. Recharge controlled rectifier 112 is gated after the 60° point in operation, recharge controlled rectifier 90 is gated after the 120° point in operation, etc.

Concurrent consideration of the timing diagrams of FIG. 2 and the inverter supply of FIG. 3 following the operation of the foregoing example fully defines the operation of the motor system of FIG. 3.

Figure 4:
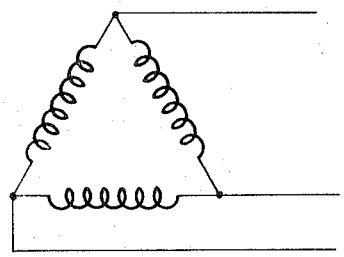
FIG. 4 is a circuit schematic of a Delta-connected winding suitable for substitution in the inverter supply system of FIG. 3.

The Delta-connected motor winding of FIG. 4 is readily adapted to the inverter motor feed arrangement of FIG. 3 by connecting the three terminals of the Delta-connected winding at the terminals of the inverter connected with the Y-connected winding shown in the drawing. When this substitution is completed, the system operation follows from the Y-connected motor operation description above.

Although the foregoing has proceeded in terms of specific examples, it should be understood that various changes and modifications can be engrafted on these examples within the spirit and scope of the appended claims.

I claim:

1. An inverter power supply system for a three-phase AC induction motor, comprising, a source of direct voltage having a positive output terminal and a negative output terminal, a three-phase AC induction motor having a winding including three motor terminals, a positive group of three power controlled rectifiers having their anodes connected to said positive output terminal of said source of direct voltage and having their cathodes connected respectively to said three motor terminals, a negative group of three power controlled rectifiers having their cathodes connected to said negative output terminal of said source of direct voltage and having their anodes connected respectively to said three motor terminals, a first gate control means connected to said power controlled rectifiers to sequentially and periodically gate them conductive and provide AC excitation to said induction motor in accordance with inverter action, three positive shut-off controlled rectifiers having their anodes connected together and having their cathodes respectively connected to the cathodes of the controlled rectifiers of said positive group of power controlled rectifiers, a positive shut-off capacitor connected between said negative terminal of said source of direct voltage and the anodes of said positive shut-off controlled rectifiers, three negative shut-off controlled rectifiers having their cathodes connected together and having their anodes respectively connected to the anodes of the controlled rectifiers of said negative group of power controlled rectifiers, a negative shut-off capacitor connected between said positive output terminal of said source of direct voltage and the cathodes of said negative shut-off controlled rectifiers, first and second charging means for respectively charging said positive and negative shut-off capacitors with a voltage having an amplitude and a polarity suitable to reverse bias respective power controlled rectifiers at preselected times when respective shut-off controlled rectifiers are gated conductive, said first and second charging means each including a source of shut-off direct voltage and a controlled rectifier connected in series across a respective shut-off capacitor, each of said shut-off capacitors effecting the commutation of selected power controlled rectifiers by applying reverse bias voltage to a selected power controlled rectifier in a series circuit path including both the selected power controlled rectifier and said source of direct voltage, and a second gate control means connected to said shut-off controlled rectifiers and synchronized with said first gate control means to control the times of conduction for said shut-off controlled rectifiers to selectively apply shut-off voltage accumulated on one of said shut-off capacitors in opposition to the voltage of said source of direct voltage to reverse bias a preselected power controlled rectifier, thereby controlling the times of communication for said power controlled rectifiers.

2. An inverter power supply system for a three-phase AC induction motor, comprising, a source of direct voltage, a three-phase AC induction motor having three electrically isolated phase windings providing a three-phase motor winding, first and second current paths for each of said phase windings interconnecting each respective phase winding across said source of direct voltage, a plurality of power controlled rectifiers included in each current path and poled such that excitation currents of both senses are controllably supplied each phase winding when respective power controlled rectifiers are selectively gated conductive, each of said current paths including a first group of power controlled rectifiers having anodes connected to the positive terminal of said source of direct voltage and having cathodes connected to ends of a respective phase winding and a second group of power controlled rectifiers having cathodes connected to the negative terminal of said source of direct voltage and anodes connected to ends of a respective phase winding, a first gating means connected with said power controlled rectifiers to control the phase, frequency, and sense of currents supplied said phase windings, a single shut-off capacitor, means for charging said shut-off capacitor to a voltage level greater than the voltage level of said source of direct voltage, a plurality of shut-off controlled rectifiers connecting said shut-off capacitor in shut-off loop circuits for respective power controlled rectifiers of said first group to control the time of termination of winding excitation through each current path of each phase winding, each shut-off loop circuit comprising said source of direct voltage, the anode and cathode of one of said power controlled rectifiers of said first group, a respective shut-off controlled rectifier and said capacitor, a second gating means connected with said shut-off controlled rectifiers and synchronized with said first gating means to control the conduction times for said shut-off controlled rectifiers to apply the voltage of said capacitor in opposition to the voltage of said source of direct voltage reverse biasing a preselected power controlled rectifier from said first group and terminating excitation currents through the current path including said preselected power controlled rectifier at predetermined times, the number of shut-off loop circuits being equal to the number of power controlled rectifiers of said first group whereby said shut-off loop circuits are operative to reverse bias only a power controlled rectifier of said first group during conduction of a respective shut-off controlled rectifier.

3. An inverter power supply system for a three-phase induction motor, comprising, a source of direct voltage having positive and negative terminals, a three-phase induction motor having three electrically isolated phase windings providing a three-phase motor winding, a first group of positive power controlled rectifiers having anodes connected to said positive terminal of said direct voltage source and having cathodes connected respectively with opposite ends of said phase windings, a second group of negative power controlled rectifiers having cathodes connected to said negative terminal of said source of direct voltage and having anodes connected respectively with opposite ends of said phase windings, means connected with said first and second groups of power controlled rectifiers for periodically biasing a controlled rectifier from a positive group and a controlled rectifier from a negative group to a conductive condition whereby each phase winding is periodically connected across said source of direct voltage and whereby current can be supplied to each phase winding in a positive and negative sense, a single shut-off capacitor, means for charging said shut-off capacitor to a voltage level greater than the voltage level of said source of direct voltage, a plurality of shut-off controlled rectifiers equal in number to the number of positive power controlled rectifiers, means connecting each shut-off controlled rectifier between one side of said shut-off capacitor and a cathode of a respective positive power controlled rectifier, means connecting the opposite end of said shut-off capacitor with one side of said source of direct voltage, and means for selectively biasing a shut-off controlled rectifier to a conductive condition to thereby shut-off one power controlled rectifier of said group of positive power controlled rectifiers, each positive power controlled rectifier being shut-off by a series circuit comprising said source of direct voltage and shut-off capacitor with the voltage on said shut-off capacitor opposing the voltage of said source across the anode and cathode of a power controlled rectifier, said system arranged such that the turning on of a shut-off controlled rectifier can only reverse bias the anode-cathode circuit of a respective positive power controlled rectifier by applying positive capacitor voltage to the cathode of a positive power controlled rectifier in opposition to the voltage of said source of direct voltage.

* * * * *